United States Patent
Cox et al.

(10) Patent No.: US 7,258,715 B2
(45) Date of Patent: Aug. 21, 2007

(54) AIR CLEANER

(75) Inventors: Paul E. Cox, Haverhill, MA (US);
Stephen M. Gatchell, Warwick, RI (US); James J. Best, Weehawken, NJ (US); Steven Vordenberg, New York, NY (US); Boris Kontorovich, Brooklyn, NY (US); Kevin Lozeau, Ridge, NY (US)

(73) Assignee: Kaz, Incorporated, New York, NY (US)

( * ) Notice: Subject to any disclaimer, the term of this patent is extended or adjusted under 35 U.S.C. 154(b) by 168 days.

(21) Appl. No.: 10/897,993

(22) Filed: Jul. 22, 2004

(65) Prior Publication Data

US 2006/0016335 A1    Jan. 26, 2006

(51) Int. Cl.
*B01D 46/10*    (2006.01)
*B03C 3/47*    (2006.01)

(52) U.S. Cl. ................... 55/422; 55/494; 96/30; 96/39; 96/64; 96/84; 96/86; 96/94; 96/97

(58) Field of Classification Search ............... 96/41, 96/63, 64, 84, 86, 87, 94, 97, 30, 39; 55/422, 55/494
See application file for complete search history.

(56) References Cited

U.S. PATENT DOCUMENTS

| 2,575,499 | A | * | 11/1951 | Manow ................... 55/422 |
| 2,811,840 | A | * | 11/1957 | Thompson ................. 62/302 |
| 3,496,704 | A | * | 2/1970 | Bandlow ................... 96/138 |
| 3,520,115 | A | * | 7/1970 | Bowen ..................... 55/422 |
| 5,356,597 | A | * | 10/1994 | Wright et al. ............. 422/169 |
| 5,433,772 | A | * | 7/1995 | Sikora ....................... 96/87 |
| 5,704,955 | A | * | 1/1998 | Giles ......................... 96/26 |
| 5,958,112 | A | * | 9/1999 | Nojima ....................... 96/55 |
| 5,993,520 | A | * | 11/1999 | Yu ............................. 96/66 |
| 6,126,727 | A | * | 10/2000 | Lo ............................. 96/39 |
| 6,361,590 | B1 | * | 3/2002 | Gilbert et al. ............. 96/384 |
| 6,425,945 | B1 | * | 7/2002 | Cheng ........................ 96/66 |
| 6,428,611 | B1 | * | 8/2002 | Andolino et al. ........... 96/25 |
| 6,506,238 | B1 | * | 1/2003 | Endo .......................... 96/79 |
| 6,749,669 | B1 |   | 6/2004 | Griffiths et al. ............. 96/67 |
| 6,878,176 | B2 | * | 4/2005 | Roudet et al. ............. 55/357 |
| 6,899,745 | B2 | * | 5/2005 | Gatchell et al. ............ 95/76 |
| 7,014,686 | B2 | * | 3/2006 | Gatchell et al. ............ 96/51 |
| 2005/0150382 | A1 | * | 7/2005 | Sheehan et al. ........... 95/277 |

FOREIGN PATENT DOCUMENTS

JP    5-154410    *    6/1993    ............... 96/30

* cited by examiner

*Primary Examiner*—Richard L. Chiesa
(74) *Attorney, Agent, or Firm*—Darby & Darby (57) ABSTRACT

An improved filter element for use in an electrostatic precipitation air cleaning device, the filter element including rod electrodes arranged through a stack of alternating fluted plastic sheets and plate electrodes. Successive plate electrodes are arranged to make contact with an alternating one or the other of the rod electrodes. The plate and rod electrodes may be composed of high impedance materials such as paper and plastic, respectively. An arrangement for removably inserting a filter element into an air cleaning device is provided. The arrangement also removably provides electrical connectivity between the filter element and the air cleaning device. The filter element can thus be readily removed and re-installed by a user.

5 Claims, 6 Drawing Sheets

AIR CLEANER

FIELD OF THE INVENTION

The present invention relates to air cleaning devices, in particular to particle precipitation devices for removing particles entrained in an air stream.

BACKGROUND INFORMATION

Conventional air cleaners, such as filtration air cleaners (FACS) remove particles from the air by trapping the particles in filters. Other air cleaners, such as electrostatic precipitation air cleaners (ESPACs), remove particles from the air by collecting the particles on electrically charged collection surfaces, usually one or more metallic plates coupled to high voltages. Once full of captured particles, the filters or plates may then be disposed of, washed or replaced, thereby necessitating convenient and safe access to the filters or plates.

FACs suffer from several drawbacks including a marked drop-off of air flow as the filter becomes increasingly blocked with collected particles; the need for a powerful fan due to the significant pressure drop across the filter (powerful fans also tend to generate more noise and consume more power than less powerful fans); and the need to periodically replace the filter.

Some of the drawbacks of FACs are overcome by ESPACs. Because ESPACs can operate with a lower pressure drop, ESPACs can operate with lower power fans, thereby reducing the noise generated as well as the power consumed. In addition, the collection plates of ESPACs can be washed or wiped clean of particles and re-used repeatedly without replacement.

ESPACs, however, require shielding to protect users from the high voltages (e.g., several kilovolts) that are applied to the metal collecting plates. Even after the power supply has been switched off, there is the danger of shock from electrical charges stored on the plates. In order to safely remove the collecting plates for cleaning, an interlock mechanism is often provided to automatically discharge the plates before they can be accessed by the user. Furthermore, electrical breakdown and leakage between the metal plates will cause a loss of efficiency and generate ozone. Increasing the spacing between the plates will reduce electrical breakdown in the air but will also reduce efficiency.

U.S. Pat. No. 6,749,669 (hereinafter the "'669 patent") addresses some of the shortcomings of conventional ESPACs. The '669 patent describes a particle precipitation device for removing particles entrained in air comprising an array of passages through which the air can pass relatively freely. The passages are provided between sheets of electrically conductive material to which are applied high and low electrical potentials alternately to provide charged sites in the array for collecting particles from the air passing therethrough. A fan is provided to create the air flow through the passages. The passages are preferably provided by sheets of fluted plastic preferably having conductive material on opposite external faces thereof. The fluted plastic sheets may, for example, be overlaid one on top of the other, folded in concertina fashion, formed into a spiral, or formed in an array of concentric sheets arranged in circles.

The '669 patent also describes the use of electrodes comprised of high impedance electrically conductive materials for applying the electrical potentials across the air passages. Unlike low impedance, metallic plates, such high impedance electrodes restrict current flow, thereby reducing the shock hazard to users.

SUMMARY OF THE INVENTION

In an exemplary embodiment, the present invention provides an improved filter element for use in an electrostatic precipitation air cleaning device, the filter element including rod electrodes arranged through a stack of alternating fluted plastic sheets and plate electrodes. Successive plate electrodes are arranged to make contact with an alternating one or the other of the rod electrodes. In an exemplary embodiment, the plate and rod electrodes are comprised of high impedance materials such as paper and plastic, respectively.

In another aspect of the present invention, an exemplary embodiment of an arrangement for removably inserting a filter element into an air cleaning device is provided. The exemplary arrangement also removably provides electrical contact between the filter element and the air cleaning device.

These and other aspects of the present invention are described below.

DETAILED DESCRIPTION

Figure 1:
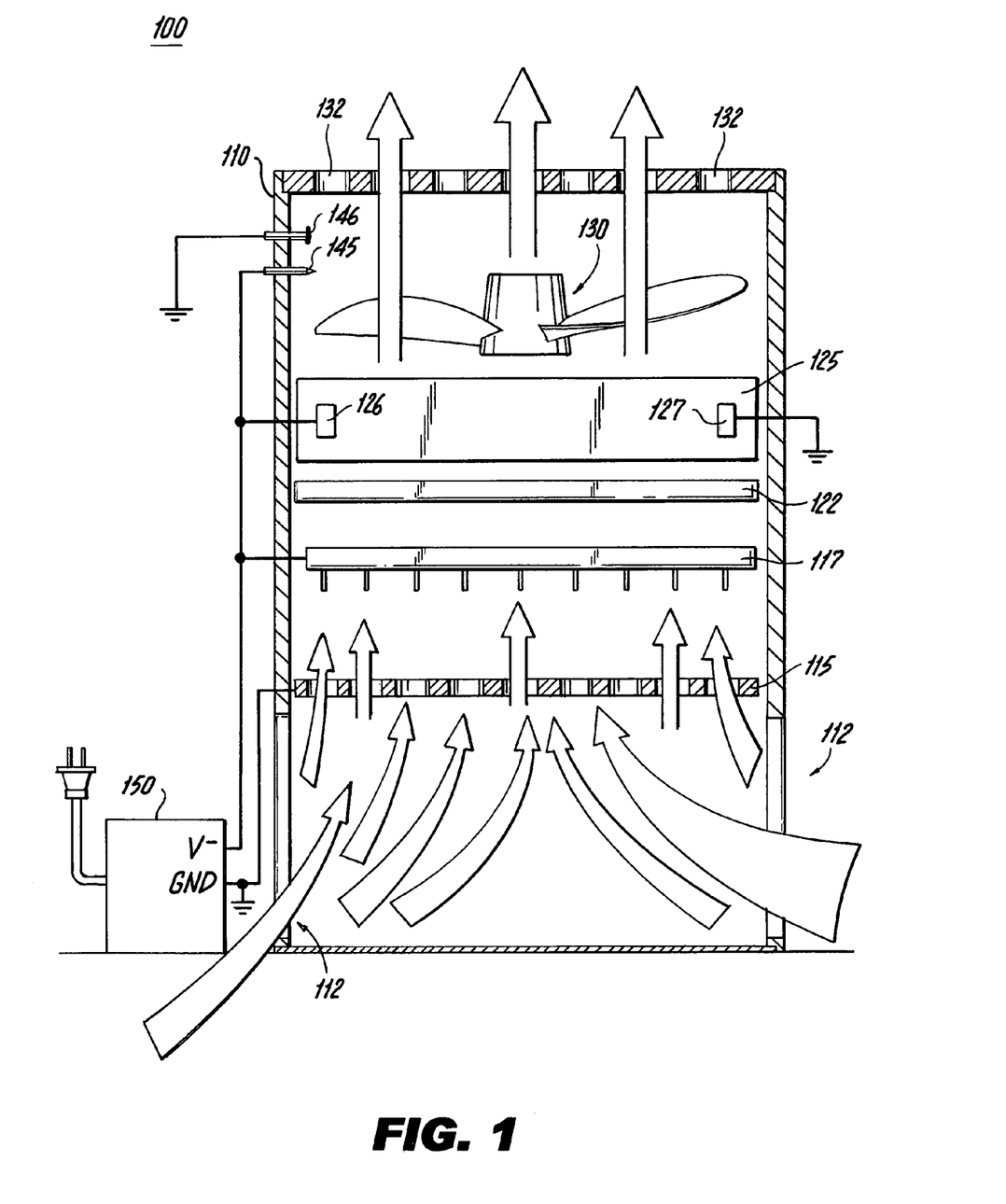
FIG. 1 shows a schematic representation of an exemplary embodiment of an air cleaning device in accordance with the present invention.

An exemplary embodiment of an air cleaning device 100 in accordance with the present invention is illustrated schematically in FIG. 1. Arrows indicate the flow of air through the air cleaning device 100. The device 100 comprises a housing 110 having air inlet vents 112 arranged generally along a lower portion of the housing, with the vents 112 preferably extending 360 degrees around the housing.

An ionization plate 115 is arranged within the housing downstream of the inlet vents 112. The ionization plate 115, described more fully below, comprises a plurality of openings allowing air to pass there through. An array of pin electrodes 117 is arranged downstream of the ionization plate.

A pre-filter 122 is arranged downstream of the pin electrodes 117 and a filter 125 is arranged downstream of the pre-filter 122. The filter 125 can be implemented as described in U.S. Pat. No. 6,749,669 (hereinafter the "'669 patent"), entitled AIR CLEANING DEVICE, which is herein incorporated by reference in its entirety. The pre-filter 122 and filter 125 preferably can be readily removed from and replaced into the air cleaning device 100. An arrangement for doing so is described further below.

The filter 125 comprises first and second electrodes 126 and 127. The electrodes 126, 127 and an exemplary construction of the filter 125 are described in greater detail below.

A fan 130 is arranged downstream of the filter 125 and air outlet vents 132 are arranged downstream of the fan at or near the top of the housing 110. A control panel (not shown) may be arranged anywhere on the housing 110, preferably where it can be conveniently accessed by a user, such as on or near the top of the housing.

A pair of electrodes 145 and 146 is arranged within the housing proximate to the air outlet vents 132 and protruding into the path of the air stream. The electrode 145 has a pointed end whereas the electrode 146 has a blunt end.

A power supply unit 150 (which would typically be arranged within the housing 110 but is shown external to the housing for clarity) generates a high positive or negative voltage relative to a ground reference which voltage and ground are coupled to various elements of the device 100. In the exemplary embodiment shown, a high negative voltage (V−) output of the power supply unit 150 is coupled to the array of pin electrodes 117, to the first electrode 126 of the filter 125, and to the pointed electrode 145, whereas the ionization plate 115, the second electrode 127 of the filter 125, and the blunt electrode 146 are coupled to ground. In an exemplary embodiment, the magnitude of the high voltage is preferably in a range of approximately 5 kV to 18 kV (e.g., V— is approximately —8 kV).

Although an air cleaning device having a vertical configuration is shown, the present invention is not limited to any particular configuration. Moreover, the relative placement shown of some of the elements (e.g., the fan with respect to the other elements) does not limit the present invention. In an alternative embodiment, the fan may be placed upstream of the ionization plate and filter elements.

Figure 7:
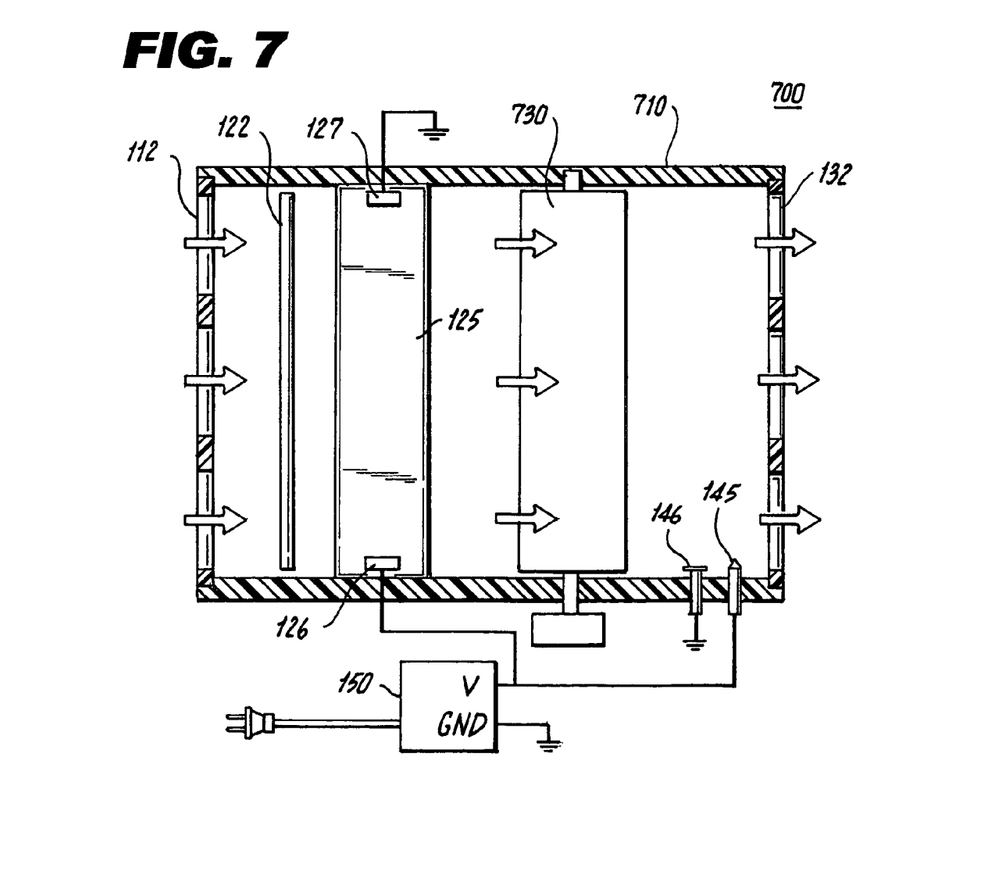
FIG. 7 shows a schematic representation of an exemplary embodiment of an air cleaning device in accordance with the present invention.

In yet another alternative embodiment of an air cleaning device 700, illustrated schematically in FIG. 7, the air flow can be generally horizontal, with the various components arranged in a horizontal configuration in a housing 710. In the exemplary embodiment shown, air is drawn into the air cleaning device 700 and propelled using a cross-flow blower 730.

In operation, the fan 130 draws air up through the interior of the housing 110, drawing air into the housing via the air inlet vents 112, up through the ionization plate 115, past the pin electrodes 117, through the pre-filter 122 and filter 125, past the electrodes 145, 146, and out of the housing through the outlet vents 132. The arrows in FIG. 1 illustrate the flow of air.

Figure 2:
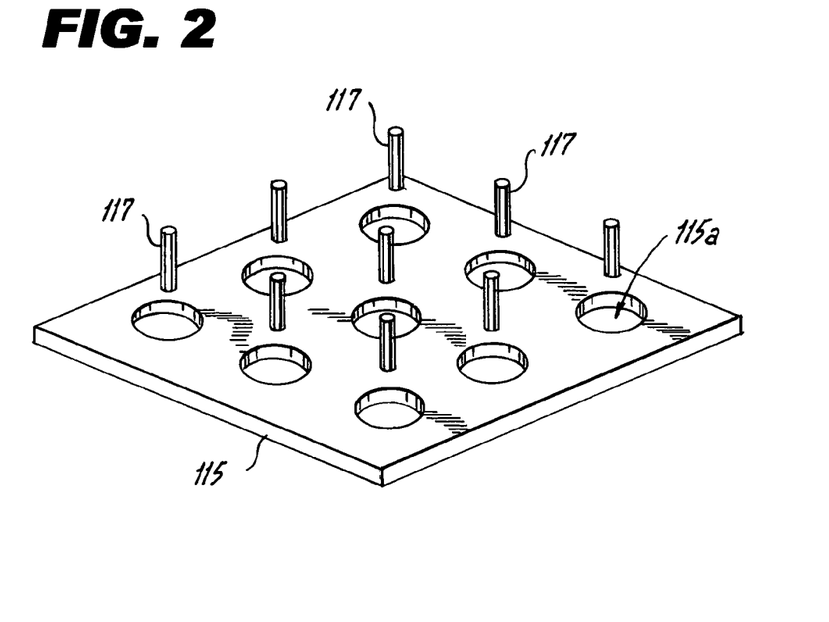
FIG. 2 shows an ionization plate and pin electrode array of an exemplary embodiment of an air cleaning device in accordance with the present invention.

FIG. 2 provides a schematic isometric view of the ionization plate 115 and the array of pin electrodes 117. In the exemplary embodiment shown, the ionization plate 115 comprises a generally square, electrically conductive plate with a 3×3 array of circular openings 115a therein. A pin electrode 117 is arranged above (or downstream of) each of the openings 115a, generally in alignment with the center point of each opening. The ionization plate 115 and pin electrodes 117 may be comprised of high or low impedance material, but because there is some current flow between the ionization plate and the pin electrodes due to corona discharging, lower impedance materials are preferable (e.g. metal).

As mentioned above, the pin electrodes 117 are coupled to a high negative voltage and the ionization plate is coupled to ground. As particle-laden air is drawn up through the openings 115a and past the pin electrodes 117, a large proportion of the particles acquire a negative charge. As the particle-laden air continues to travels upwards, large particles are removed from the air stream by the pre-filter 122 before the air stream enters the filter 125.

A large proportion of the airborne particles entering the filter 125 are deposited therein. The air passing through the filter 125 continues up past the fan 130 and the pin electrodes 145, 146 before exiting the device from the outlet vents 132. The pin electrodes 145, 146 act to ionize the outgoing air.

Figure 3A:
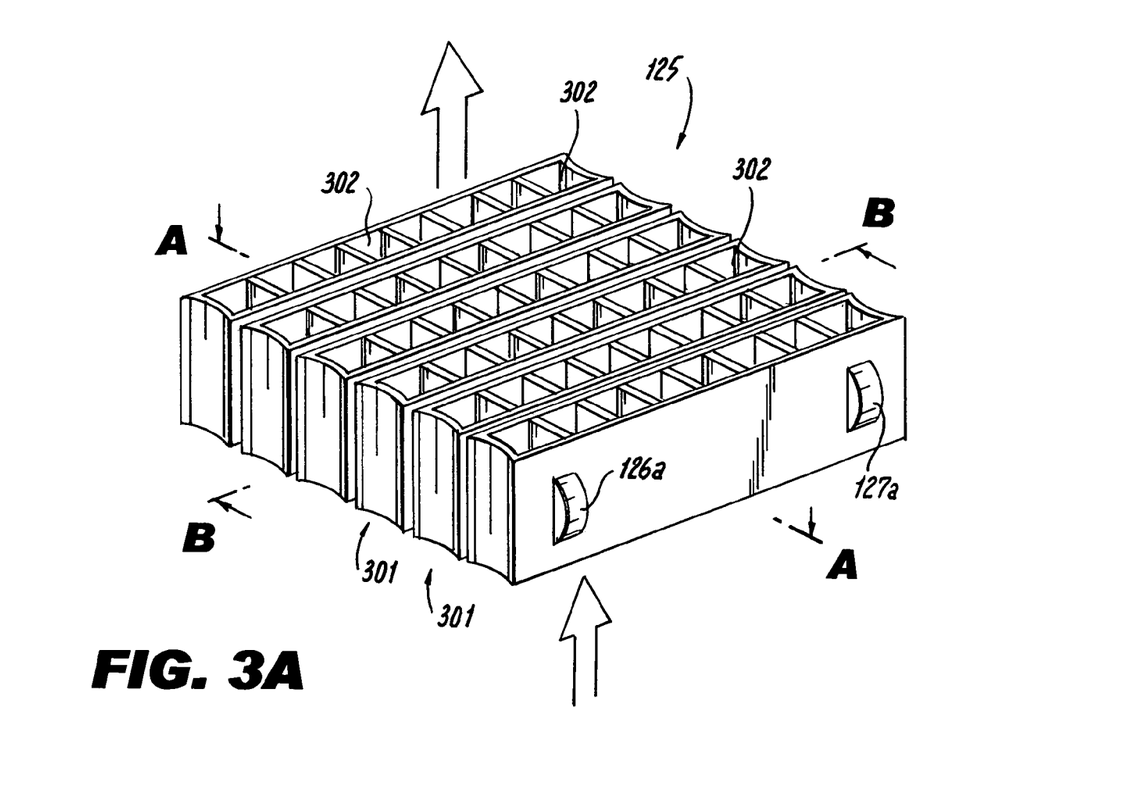
FIG. 3A shows an isometric view and FIG. 3B shows a partial exploded isometric view of an exemplary embodiment of a filter element for an air cleaning device in accordance with the present invention.
Figure 3B:
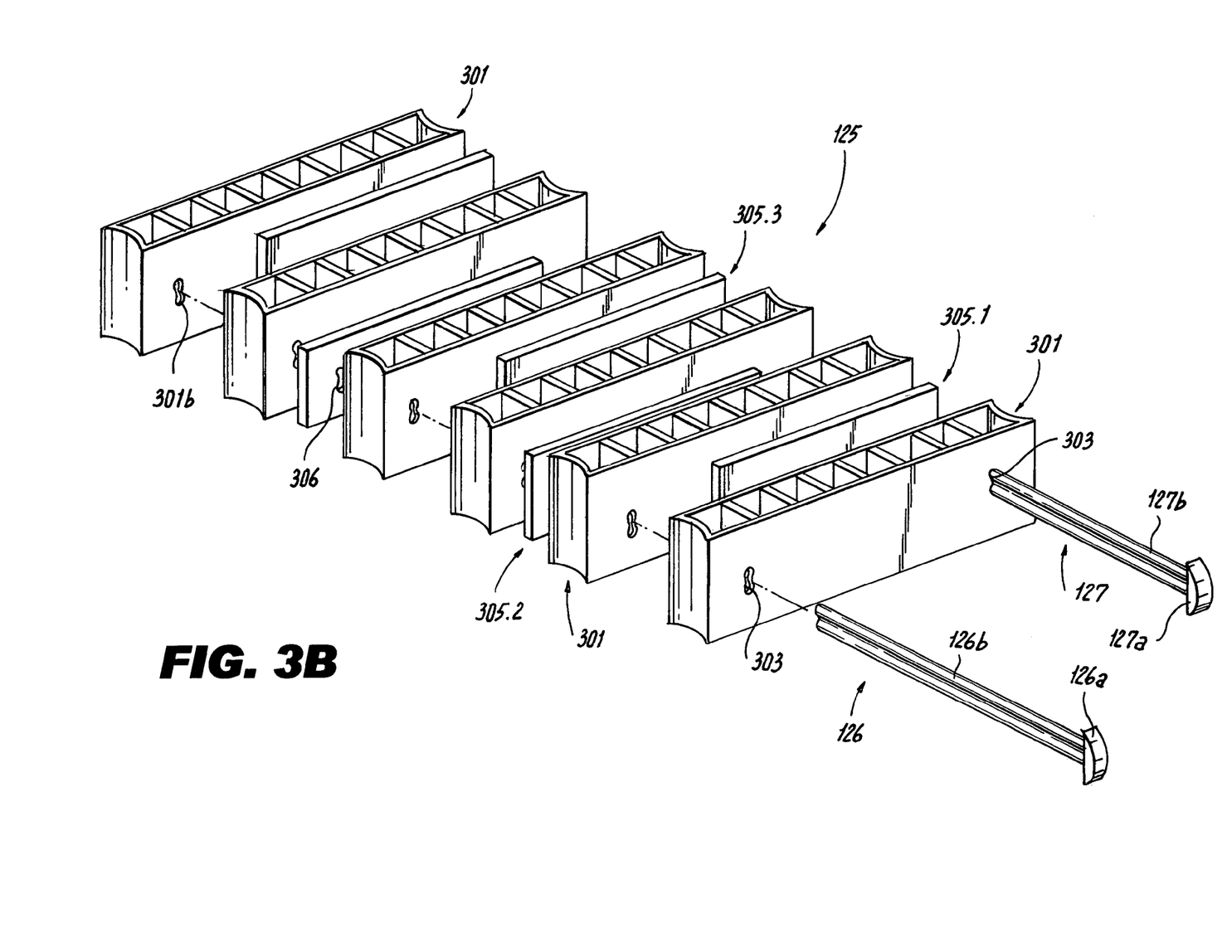

The filter 125 is shown in greater detail in FIGS. 3A and 3B. FIG. 3A is an isometric view of the filter 125 with some of the dimensions exaggerated to more clearly show the relevant features. In an exemplary embodiment, the filter 125 comprises a plurality of sheets 301 of fluted twin-walled extruded plastic. Each sheet 301 has a plurality of substantially parallel flutes 302 extending therethrough with the sheets 301 being oriented so the flutes 302 are aligned with the flow of air (indicated by arrows). Additional details and alternate embodiments are described in the '669 patent.

FIG. 3B shows an exploded isometric view of the filter 125 illustrating further features of the filter. Each sheet 301 is generally rectangular and comprises an opening 303 proximate to each of the two short edges of the sheet and substantially equidistant between the long edges of the sheet. The openings 303 are shaped to receive an electrode 126, 127, which in the embodiment shown are rod-like (and thus will be referred to as rod electrodes 126, 127). When the sheets 301 are stacked together, the openings 303 are in alignment, allowing the rod electrodes 126, 127 to be inserted through the stack of sheets 301. Alternately, the sheets 301 can be stacked onto the rod electrodes 126, 127.

As shown further in FIG. 3B, plate electrodes 305 are arranged between adjacent sheets 301. Each of the plate electrodes 305 has a shape similar to that of the sheets 301 but is smaller. In the exemplary embodiment shown, the sheets 301 and plate electrodes 305 are rectangular and the plate electrodes are smaller than the sheets in at least the longer dimension. Each plate electrode 305 comprises an opening 306 proximate to one end of the plate electrode. When the opening 306 of a plate electrode 305 is in alignment with an opening 303 of a sheet 301, the plate electrode does not reach the other opening 303 of the sheet 301 and there is a clearance between the plate electrode and the other opening.

The plate electrodes 305 may comprise low or high impedance materials. In an exemplary embodiment, the plate electrodes 305 are comprised of bond paper or the like.

As shown in FIG. 3B, the plate electrodes 305 are arranged between the sheets 301 in an alternating pattern wherein the opening 306 of each successive plate electrode is in alignment with an alternating one of the openings 303 of the plates 301. As a result, when the rod electrode 127 is inserted in the stack of sheets 301 and plate electrodes 305, the rod electrode 127 makes contact with every other plate electrode 305 starting with the first plate electrode 305 (i.e., plate electrodes 305.1, 305.3, 305.5, etc.) and the rod electrode 126 makes contact with every other plate electrode 305 starting with the second plate electrode 305 (i.e., plate electrodes 305.2, 305.4, 305.6, etc.)

As a result, when rod electrode 126 is coupled to V- and rod electrode 127 is coupled to ground, an electric field is established between the opposing walls of each sheet 301, i.e., across the thickness of each sheet. As airborne particles flow through the flutes 302 of the sheets 301, they are deposited on the walls of the flutes 302.

Figure 4A:
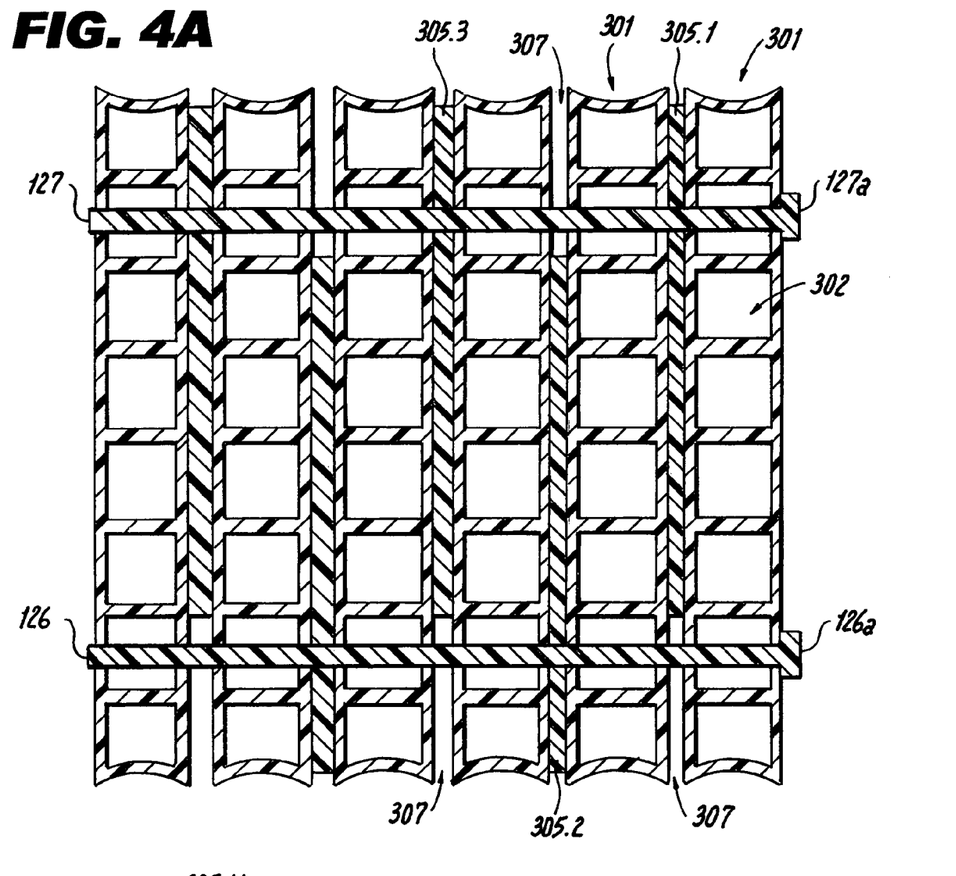
FIGS. 4A, 4B and 4C show cross-sectional views of the filter of FIGS. 3A and 3B.

FIG. 4A shows a section A-A of the filter 125 of FIG. 3A. FIG. 4A shows the alternating connection of successive plate electrodes 305 to the rod electrodes 126 and 127. As shown in FIG. 4A, each plate electrode 305 contacts only one of the electrodes 126, 127. Each of the plate electrodes 305 may be embedded in or surrounded by a layer 307 of adhesive or the like between adjacent sheets 301.

Figure 4B:
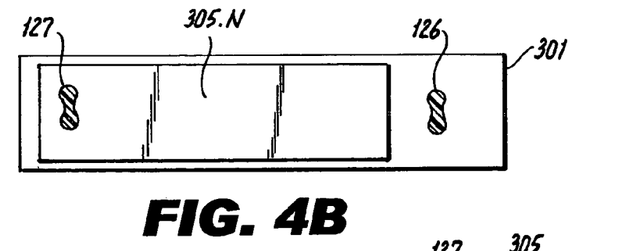

FIG. 4B shows a section B-B of the filter 125 of FIG. 3A. As shown, each plate electrode 305 and sheet 301 has a rectangular shape, with the plate electrode 305 being shorter than the sheet 301 so as to avoid contacting both electrodes 126 and 127. In addition, there should be sufficient clearance between the edges of the plate electrodes 305 and the sheets 301 so as to avoid charge leakage between successive plate electrodes.

Figure 4C:
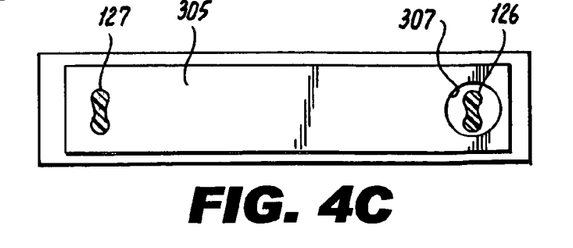

In an alternate embodiment, as shown in FIG. 4C, the plate electrodes 305 can be made substantially closer in size to the plates 311 to provide better electrical field characteristics. In this embodiment, contact with one of the electrodes 126, 127 (126 in the illustration) is avoided by providing the plate electrode 305 with an opening 307 surrounding that electrode (126). The opening 307 should provide sufficient clearance around the rod electrode (126) so as to avoid charge leakage between the plate electrode 305 and the rod electrode (126).

FIGS. 3B and 4B show the electrodes 126, 127 in greater detail. As shown in FIG. 3B, each of the electrodes 126, 127 comprises an elongate portion 126*b*, 127*b* which extends into and through the stack of sheets 301 and plate electrodes 305. In addition, each of the electrodes 126, 127 comprises a head portion 126*a*, 127*a* which remains exposed and acts as a contact pad to which the high voltage or ground potential is applied (as described more fully below).

The rod electrodes 126, 127 may be of high or low impedance and may be constructed of any suitable electrically conductive material. In an exemplary embodiment, the rod electrodes 126, 127 are constructed of conductive plastic and have high impedances (e.g., on the order of mega ohms over their lengths). A variety of means for attaching the electrodes 126, 127 to the filter body can be used including adhesives or the like. In an exemplary embodiment, the elongate portions 126*b* and 127*b* of the electrodes are preferably made longer than the stack of sheets 301 and plate electrodes 305. Where the electrodes 126, 127 are constructed of conductive plastic, the protruding ends of the elongate portions 126*b*, 127*b* can be melted or molded to form stops thus capturing the stack of sheets and electrodes between the stops and the electrode head portions 126*a*, 127*a* and thus preventing the electrodes 126, 127 from being pulled out of the stack.

Exemplary cross-sections of the elongate portions 126*b*, 127*b* of the electrodes can be seen in FIG. 4B. As shown in FIG. 4B, the elongate portions 126*b*, 127*b* of the electrodes have a figure-8-like, or "dog bone" cross-section. Compared to an oval cross-section of similar dimensions, the figure-8-like cross-section provides greater surface area for contact between the electrodes 126, 127 and the plate electrodes 305. Other cross-sections that may be used include a Y-shape or a star shape (with four or more protrusions), a polygon (e.g., square, hexagon). The corresponding holes 306 in the plate electrodes 305 are preferably smaller than the cross-sections of the rod electrodes 126, 127 so as to provide good electrical and mechanical contact there between. For example, the openings 306 may be circular and the cross-sections of the rod electrodes 126, 127 may be squares with triangular protrusions on the flat sides that pierce or deform the plate electrodes 305 when inserted through the openings 306.

In another aspect of the present invention, an arrangement is provided for removably inserting the filter element 125 into the air cleaning device 100. Such an arrangement is illustrated in FIG. 5.

Figure 5:
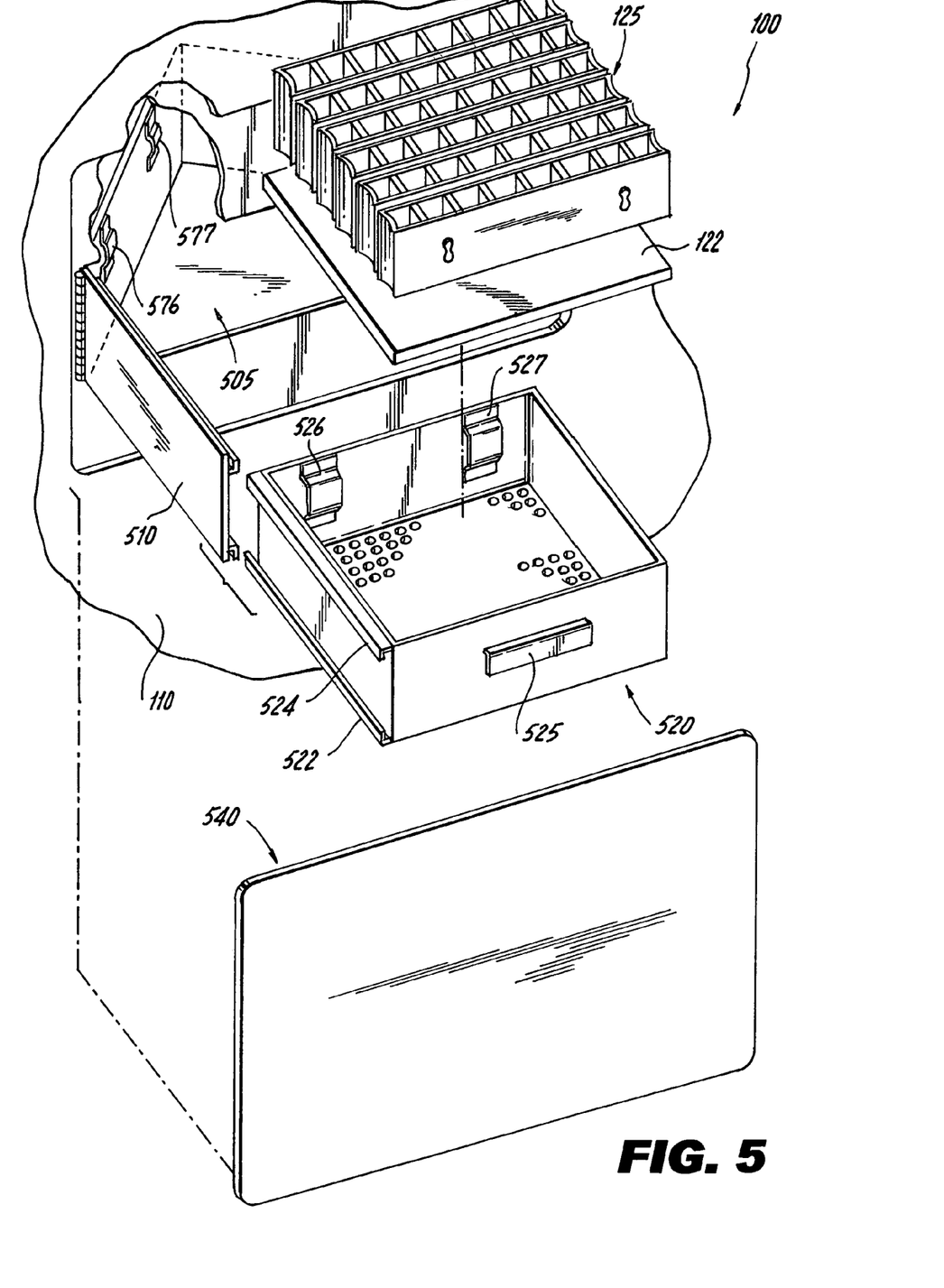
FIG. 5 shows an arrangement for removably inserting a filter element into an exemplary embodiment of an air cleaning device in accordance with the present invention.

As shown in FIG. 5, the housing 110 of the cleaning device 100 is provided with an opening 505 through which the filter 125 (and pre-filter 122) can be inserted into or removed from the device 100. Proximate to a first edge of the opening 505, an arm 510 is hingedly attached to the housing. In the exemplary embodiment shown, the arm 510 is generally rectangular and is hingedly attached to the housing 110 along a shorter edge of the arm.

In the arrangement of FIG. 5, a removable tray member 520 is provided which is adapted to slidably engage the arm 510. In the exemplary embodiment shown, along one side of the tray member 520, the tray member comprises channel elements 522 and 524 which allow the tray member to be slid onto the arm 510 by slidably engaging the arm therebetween. A wide variety of configurations for the arm 510 and complementary features on the tray member 520 for slidably engaging the arm are contemplated by the present invention (e.g., the arm 510 may be cylindrical and a complementary bushing provided on the side wall of the tray member for receiving the cylindrical arm therein).

The tray member 520 includes an open top side through which the pre-filter 122 and filter 125 can be placed into the tray member. The bottom wall of the tray member 520 is perforated, allowing air to flow therethrough while supporting the pre-filter 122 and filter 125. The internal shape and dimensions of the tray member 520 are preferably such as to snugly accommodate the filter 125 therein.

To install the filter 125 and pre-filter 122 into the air cleaning device 100, the pre-filter 122 is placed into the tray member 520 and the filter 125 is placed in the tray member above the pre-filter. The tray member 125 is then slid onto the hinged arm 510. When fully engaged onto the arm 510, the tray member 520 and arm 510 are swung into the housing 110, thereby placing the filter 125 and pre-filter 122 into the housing and in the path of the air flow (as illustrated schematically in FIG. 1). The tray member 520 may include a handle 525 or similar feature to facilitate the sliding and swinging actions.

A removable panel 540 can be attached to the housing 110 to cover the opening 505. The panel 540 is preferably coupled to a switch mechanism whereby the air cleaner device 100 is enabled to operate only when the panel 540 is in place.

Removal of the filter 125 and pre-filter 122 from the air cleaning device 100 entails reversal of the above-described procedure.

As described above, the filter 125 includes electrical contacts 126, 127. The arrangement of FIG. 5 includes electrical contact features to provide electrical connectivity between the removable filter 125 and the power supply unit 150 located in the air cleaning device 100. As shown in FIG. 5, the tray member 520 includes electrical contacts 526 and 527 arranged along the inner surface of one of the walls of the tray member. The electrical contacts 526 and 527 are so arranged that when the filter 125 is seated in the tray member 520, the electrical contacts 526 and 527 make contact with the exposed head portions 126*a* and 127*a*, respectively, of the electrodes 126, 127 of the filter 125.

Figure 6:
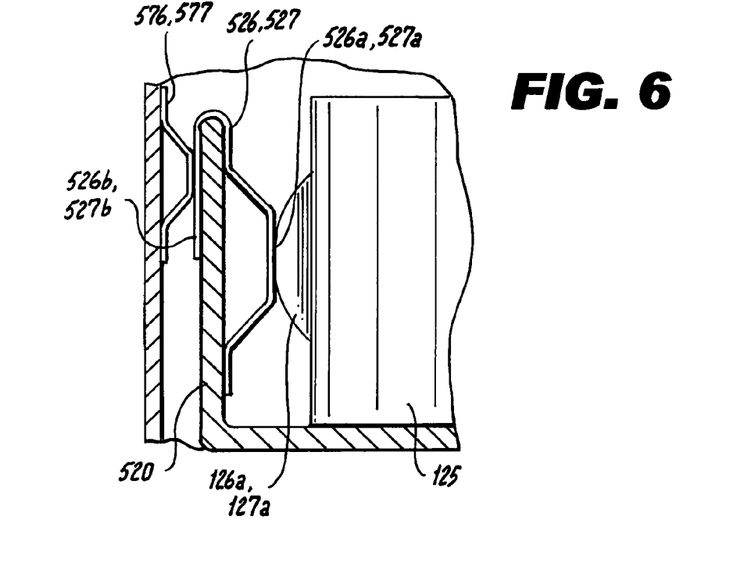
FIG. 6 shows an electrical contact arrangement for providing electrical contact to a filter element in accordance with the present invention.

FIG. 6 is a partial cross-sectional view showing the electrical contacts 526, 527 in greater detail. As shown in FIG. 6, the contacts 526, 527 include inner portions 526*a*, 527*a* which protrude into the interior of the tray member 520 to make contact with the filter electrodes 126, 127. The contacts also include outer portions 526*b*, 527*b* which are located on the outer surface of the tray member wall. When the tray member 520 is fully inserted into the housing 110 (i.e., when it is fully slid onto the arm 510 and the assembly fully swung into the housing) the outer contact portions 526*b*, 527*b* come into electrical contact with contacts 576 and 577, respectively, arranged within the housing 110 (see FIG. 5). The contacts 576 and 577 are coupled to the high voltage output of the power supply unit 150 and ground potential, respectively. As such, when the filter element 125 is fully inserted in the tray member 520 and the tray member is fully inserted into the housing 110, electrical connectivity of the filter 125 to the high voltage (V-) and ground potential is thus provided.

The contacts 526, 527 and 576, 577 may be comprised of high or low impedance material (e.g., metal). In an exemplary embodiment, the contacts 526, 527 and 576, 577 are preferably comprised of spring steel and shaped to provide resilient biasing when in contact with each other and with the electrodes 126, 127 of the filter element 125. In an alternate embodiment, the contacts may comprise conductive closed-cell foam, which is resilient and like the spring steel contacts can provide resilient biasing for good contact.

It is to be understood that while the invention has been described above in conjunction with preferred embodiments, the description is intended to illustrate and not to limit the scope of the invention, as defined by the appended claims. Indeed, various modifications of the invention in addition to those described herein will become apparent to those skilled in the art from the foregoing description and the accompanying figures. Such modifications are intended to fall within the scope of the appended claims.

It is further to be understood that all values are to some degree approximate, and are provided for purposes of description.

The disclosures of any patents, patent applications, and publications that may be cited throughout this application are incorporated herein by reference in their entireties.

What is claimed is:

1. An air cleaning device comprising:
   a housing, the housing having an opening;
   an arm member, the arm member being hingedly attached to the housing proximate to the opening;
   a tray member for receiving a filter element therein, the tray member including:
      a perforated bottom wall; and
      means for slidably engaging the arm member.

2. The air cleaning device of claim 1, wherein the tray member includes electrical contacts for electrically contacting respective contacts on the filter element.

3. The air cleaning device of claim 2, wherein the electrical contacts contact respective contacts in the air cleaning device when the tray member is in the air cleaning device.

4. The air cleaning device of claim 1, wherein the filter element comprises:
   a plurality of sheet elements, each sheet element including first and second walls separated from each other so that air may flow between the first and second walls;
   a plurality of plate electrodes;
   a first rod electrode; and
   a second rod electrode,
wherein:
   the plurality of sheet elements and plate electrodes are alternately arranged in a stack,
   the first and second rod electrodes traverse the stack, and
   successive plate electrodes alternately contact one of the first and second rod electrodes.

5. An air cleaning device comprising:
   a housing, the housing having an opening;
   an arm member, the arm member being hingedly attached to the housing proximate to the opening;
   a tray member for receiving a filter element therein, the tray member including:
      a perforated wall; and
      means for slidably engaging the arm member.

* * * * *